United States Patent [19]

Yasui et al.

[11] Patent Number: 4,762,398
[45] Date of Patent: Aug. 9, 1988

[54] PIXEL TRANSISTOR FREE OF PARASITIC CAPACITANCE FLUCTUATIONS FROM MISALIGNMENT

[75] Inventors: Masaru Yasui, Yao; Taisuke Miyazu, Hikone, both of Japan

[73] Assignee: Hosiden Electronics Co., Ltd., Osaka, Japan

[21] Appl. No.: 4,405

[22] Filed: Jan. 20, 1987

[51] Int. Cl.$^4$ ............ G02F 1/133; H10L 29/78
[52] U.S. Cl. ............ 350/334; 357/23.7
[58] Field of Search ........... 350/333, 334, 336, 339 R; 357/23.7, 45; 340/784

[56] References Cited

U.S. PATENT DOCUMENTS 3,225,261 12/1965 Wolf ................................. 357/45 X
4,597,001 6/1986 Bortscheller et al. ............. 357/23.7

FOREIGN PATENT DOCUMENTS 0209113 1/1987 European Pat. Off. .
0159722 8/1985 Japan ................................. 350/334

OTHER PUBLICATIONS

"Characteristics of Field–Effect Transistor Using Fluorinated Amorphous–Silicon (a–Si:F)", by Matsumura et al., *Electronic Letters*, vol. 17, No. 3, 6/25/81, pp. 457–458.

Primary Examiner—Stanley D. Miller
Assistant Examiner—David Lewis
Attorney, Agent, or Firm—Pollock, VandeSande and Priddy

[57] ABSTRACT

In a liquid crystal display device, display electrodes are arranged in a matrix form, gate and source buses are provided for each row and column of the display electrodes, and a pixel driving composite transistor is connected between each display electrode and the gate and source buses for driving the display electrode. Source-drain electrode pairs opposite in the direction of arrangement, which are equal in number, are provided for each transistor, and a common semiconductor layer and a common gate electrode are provided for all the source and drain electrodes to form an even number of thin film transistors connected in parallel to one another, thereby constituting the composite transistor for driving a pixel.

8 Claims, 10 Drawing Sheets

PIXEL TRANSISTOR FREE OF PARASITIC CAPACITANCE FLUCTUATIONS FROM MISALIGNMENT

BACKGROUND OF THE INVENTION

This invention relates to thin film transistors which are employed for driving pixels (i.e., picture elements) of an active matrix type flat panel display such as a liquid crystal display device, for example.

A prior art liquid crystal display device of the conventional type has a structure as shown in FIG. 1. The device comprises a pair of transparent substrates of glass or the like facing each other. A spacer 13 is provided between the substrates 11 and 12 along the edges thereof. A liquid crystal 14 is sealed between the substrates 11 and 12. The substrates 11 and 12, spacer 13 and liquid crystal 14 constitute a liquid crystal cell. A plurality of display electrodes 15 consisting of a transparent conductive film are formed on the inner surface of one of the transparent substrates, i.e., substrate 11. Also thin film transistors 16 are formed as switching elements such that they are contiguous to the display electrodes 15 with their drains connected thereto. A common electrode 17 is formed on the other transparent substrate 12. The common electrode 17 faces the plurality of display electrodes 15.

The display electrodes 15 serve as picture elements, for instance. As shown in FIG. 2, they are square in shape and arranged in a closely spaced-apart relation to one another. They are arranged in rows and columns on the transparent substrate 11. Gate buses 18 are formed such that they extend near and along the individual rows of display electrodes 15. Source buses 19 are formed such that they extend near and along the individual columns of display electrodes 15. The thin film transistors 16 noted above are formed at the intersections of the gate buses 18 and source buses 19. Each thin film transistor 16 has its gate connected to the associated gate bus 18, its source connected to the associated source bus 19 and its drain connected to the corresponding display electrode 15.

When one of the gate buses 18 and one of the source buses 19 are selected, a voltage is applied between the selected buses. As a result, only the corresponding thin film transistor 16 is turned on. Charge is stored on the display electrode 15 connected to the drain of the "on" thin film transistor 16. A voltage is applied across only a portion of the liquid crystal 14 between this display electrode 15 and the common electrode 17. Only the picture element of this display electrode 15 is thus rendered transparent or opaque. In this way, only selected display electrodes are driven for display. Actually, the picture elements of selected display electrodes are usually rendered transparent or opaque in combination with a polarizer (not shown).

Usually, the thin film transistor 16 has a structure as shown in FIGS. 3 and 4. Referring to these Figures, the display electrodes 15 and source buses 19 are formed from a transparent conductive film, e.g., an ITO, on the transparent substrate 11. A semiconductor layer 21 of amorphous silicon or the like is formed such that it strides parallel and closely spaced-apart portions of each display electrode 15 and the associated source bus 19. A gate insulating film 22 of silicon nitride or the like is formed on the semiconductor layer 21. A gate electrode 23 is formed on the gate insulating film 22 such that it overlies part of each display electrode 15 and associated source bus 19 via the gate insulating film 22 and each semiconductor layer 21. One end of the gate electrode 23 is connected to the associated gate bus 18. Portions of the display electrode 15 and source bus 19 facing each gate electrode 23 constitute drain and source electrodes 15a and 19a, respectively. The thin film transistor 16 is constituted by these electrodes 15a and 19a, the semiconductor layer 21, the gate insulating film 22 and the gate electrode 23. The individual gate electrodes 23 and gate buses 18 are formed simultaneously from aluminum, for instance.

In the conventional liquid crystal display device, electrostatic (parasitic) capacitances Cgd and Csg are formed between the gate electrode 23 of each thin film transistor 16 and its drain and source electrodes 15a and 19a, respectively. Further, a parasitic resistance Rs exists whose value depends upon the area of the semiconductor layer 21 between the gate electrode 23 and each of the drain and source electrodes 15a and 19a. The electrostatic capacitances Cgd and Csg and the parasitic resistance Rs exert a great influence on the characteristics of the thin film transistor 16. Even a slight misalignment of the gate electrode 23 relative to the semiconductor layer 21 and the drain and source electrodes 15a and 19a directly causes variations in the electrostatic capacitances Cgd and Csg, leading to dispersion in the characteristics of the thin film transistors 16. For example, in the case where the gate electrode and drain and source electrodes are designed to overlap 3 μm and the width of the channel of each transistor 16 is represented by w, if they are formed as designed, then each of the electrostatic capacitances Cgd and Csg will correspond to 3w. When the gate electrode 23 shifts by 1 μm toward the source electrode 19a, the electrostatic capacitances Cgd and Csg correspond to 2w and 4w, respectively. When the gate electrode 23 shifts by 2 μm toward the source electrode 19a, the electrostatic capacitances Cgd and Csg correspond to 5w and w, respectively. Accordingly, such a misalignment of the gate electrode 23 seriously affects the characteristic of each thin film transistor 16. In the liquid crystal display device, dispersion in the characteristics of the thin film transistors 16 will produce variations in display.

As a solution to this problem, it may be possible to design a structure in which a second thin film transistor is connected to each display electrode at a position opposite from the afore-mentioned thin film transistor and these thin film transistors are connected in parallel to each other.

FIG. 5 schematically illustrates an example of the liquid crystal display device employing such a structure. The display electrodes 15 are arranged in a matrix form, and as in the cases of FIGS. 2 and 3, the source bus 19 is formed along one side of each column of the display electrodes 15 and connected to each display electrode 15 via the thin film transistor 16. Moreover, a thin film transistor 25 is connected to each display electrode 15 at the side opposite from the thin film transistor 16, that is, at the left of the display electrode 15 in FIG. 5. Extending along each column of the display electrodes 15 at the opposite side from the source bus 19 is another source bus 26, to which are connected source electrodes of the thin film transistors 25. The pair of source buses 19 and 26 for each column of the display electrodes 15 are interconnected at both ends, forming a loop. Though not shown, the thin film transistor 25 has its gate electrode connected to the gate bus 18 to which is connected the gate electrode of the thin film transistor 16 connected to the display electrode 15 corresponding thereto. Accordingly, the two thin film transistors 16 and 25 are connected in parallel to each other for each display electrode 15.

As depicted in FIGS. 6 and 7 in which the parts corresponding to those in FIGS. 3 and 4 are identified by the same reference numerals, each source bus 26 is formed along one side of each column of display electrodes 15 on the opposite side from the source bus 19. An amorphous silicon or like semiconductor layer 27 is extended between the source bus 26 and each display electrode 15 and is covered with the gate insulating film 22, on which a gate electrode 28 is formed, thus constituting each thin film transistor 25. The gate electrode 28 is connected to the gate bus 18.

Also in the thin film transistor 25 of the above structure, there exist an electrostatic capacitance $Cgd_2$ at the overlapping portion between the gate electrode 28 and the display electrode 15, that is, between the gate electrode 28 and the drain electrode 15b, and an electrostatic capacitance $Csg_2$ at the overlapping portion between the gate electrode 28 and the source bus 26, that is, between the gate electrode 28 and the source electrode 26a, as shown in FIG. 8. In this instance, however, the pair, of thin film transistors 16 and 25 are disposed on both sides of each display electrode 15 and are connected in parallel to each other. Therefore, letting the electrostatic capacitances set up between the gate electrode 23 and the display electrode 15 and the source bus 19 be represented by $Cgd_1$ and $Csg_1$, respectively, the electrostatic capacitances $Cgd_1$ and $Cgd_2$ and the electrostatic capacitances $Csg_1$ and $Csg_2$ are connected in parallel to each other.

Now let it be assumed that when the gate electrodes 23 and 28 overlap the drain and source electrodes as designed, the electrostatic capacitances $Cgd_1 + Cgd_2$ and $Csg_1 + Csg_2$ are each $3w$, namely, that each gate electrode overlaps the drain and source electrodes 3 μm and the channel width is $w/2$. The gate electrodes 23 and 28 of the thin film transistor 25 are formed simultaneously using the same mask; so that, for instance, when the gate electrode 23 shifts to the right-hand side in FIGS. 6, 7 and 8, the gate electrode 28 also shifts to the right-hand side by the same amount. This causes an increase in the electrostatic capacitance $Csg_1$ between the source and gate electrodes of the thin film transistor 16, but the electrostatic capacitance $Csg_2$ between the source and gate electrodes of the thin film transistor 25 decreases by the same amount as the amount of increase in the electrostatic capacitance $Csg_1$. As a result of this, the source-gate capacitances of the thin film transistors 16 and 25 become $3w$ as designed. The same is true of the electrostatic capacitance $Cgd_1$ between the gate and drain of the thin film transistor 16 and the electrostatic capacitance $Cgd_2$ between the gate and drain of the thin film transistor 25; namely, an increase in one of them causes a decrease in the other, keeping their sum constant at all times. Therefore, even if the mask alignment is slightly displaced, the electrostatic capacitances can always be obtained at designed values. Accordingly, even where misalignment of the mask for forming the gate electrodes is not uniform throughout the display screen of the liquid crystal display device, thin film transistors of the same characteristics can be obtained. The sum of the parasitic resistances Rs is also constant at all times because the resistance on the side of the thin film transistor 25 decreases when the resistance on the side of the thin film transistor 16 increases.

However, in the display device of the type in which the pair of thin film transistors are connected in parallel, since the two thin film transistors are spaced apart, the bus for supplying a source or gate signal is approximately twice as long as in ordinary liquid crystal display devices, and the spacing of the source or gate buses is so small that they are often broken and short-circuited during manufacture, impairing the yield rate of fabrication of the display devices.

SUMMARY OF THE INVENTION

It is therefore an object of the present invention to provide pixel driving transistors which are difficult to be affected by mask misalignment during fabrication, equal in characteristics, do not require any particularly long source or gate buses, and hence are easy to manufacture.

According to the present invention, a plurality of pairs of source and drain electrodes are provided such that the number of pairs of the source and drain electrodes arranged in the same order in one direction is equal to the number of pairs of the source and drain electrodes arranged in the same order in the opposite direction, and both electrodes are disposed opposite a gate insulating film and a gate electrode common to them. With such a structure, for example, even if misalignment of the mask occurs during manufacture, the overall gate-source electrostatic capacitance is always constant and the gate-drain electrostatic capacitance is also constant at all times. Further, since the gate electrode is common to the plurality of source and drain electrodes, the source and gate buses need not be extended and the number of source or gate buses need not be increased, ensuring the reduction of accidents such as short-circuiting of adjoining buses and breakage of buses.

DESCRIPTION OF THE PREFERRED EMBODIMENTS

Figure 1:
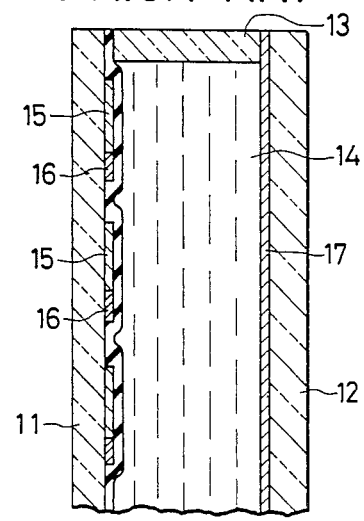
FIG. 1 is a cross-sectional view showing a part of the general structure of a prior art liquid crystal display device.
Figure 2:
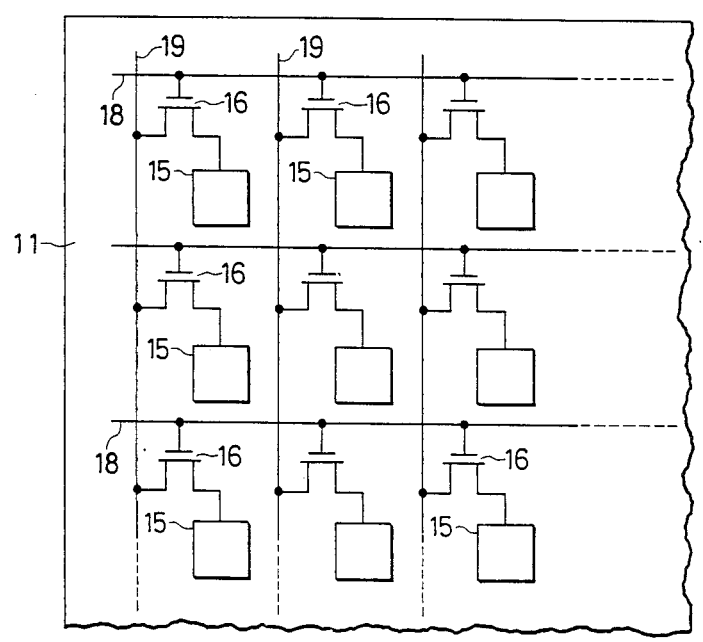
FIG. 2 is a schematic circuit diagram of a prior art active matrix liquid crystal display device.
Figure 3:
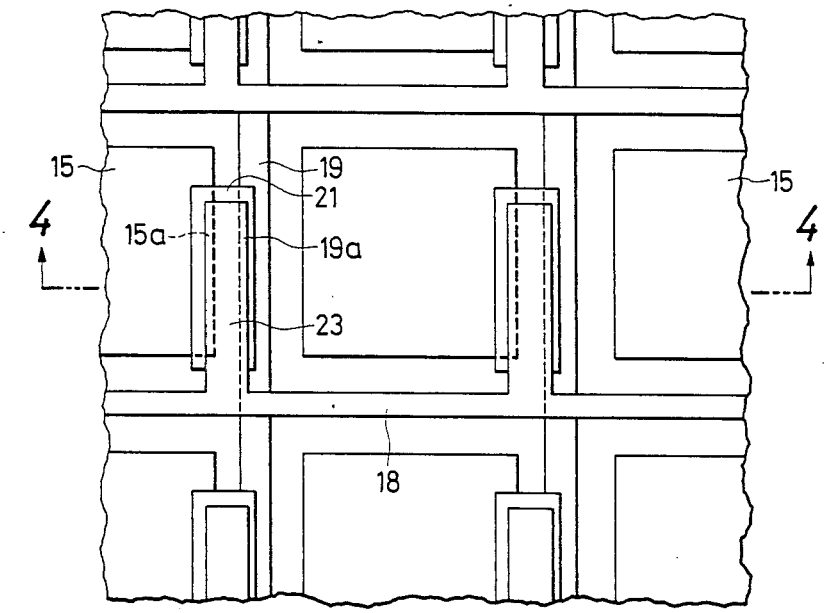
FIG. 3 is a plan view showing the arrangement of display electrodes 15 and transistors 16 of the liquid crystal display device depicted in FIG. 1.
Figure 4:
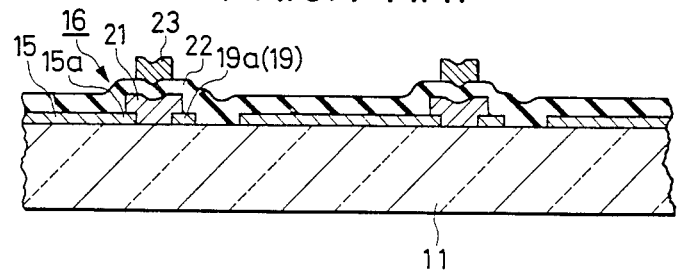
FIG. 4 is a cross-sectional view taken on the line 4—4 in FIG. 3.
Figure 5:
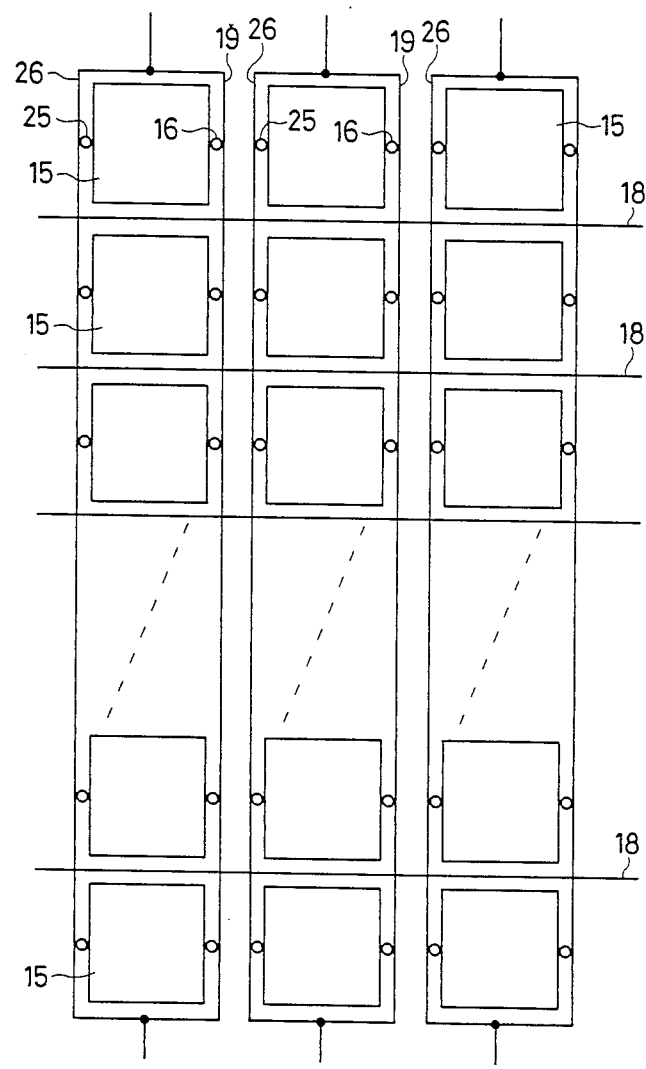
FIG. 5 is a diagram schematically showing the relationship between display electrodes 15, transistors 16, 25 and source buses 19, 26 of an improved liquid crystal display device.
Figure 6:
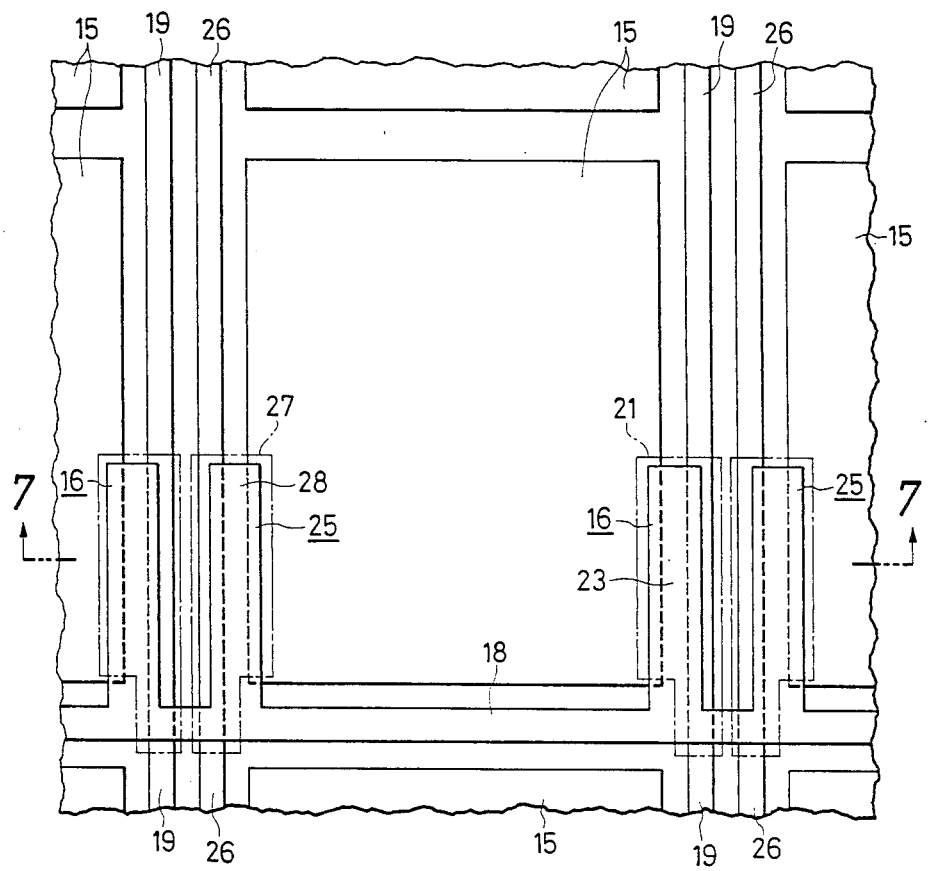
FIG. 6 is a plan view, similar to FIG. 3, of the liquid crystal device shown in FIG. 5.
Figure 7:
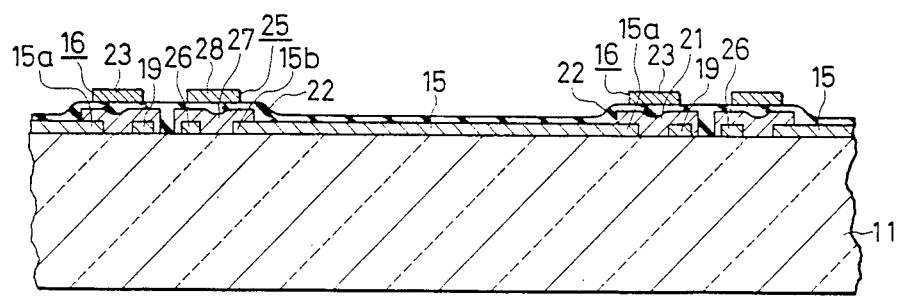
FIG. 7 is a cross-sectional view taken on the line 7—7 in FIG. 6.
Figure 8:
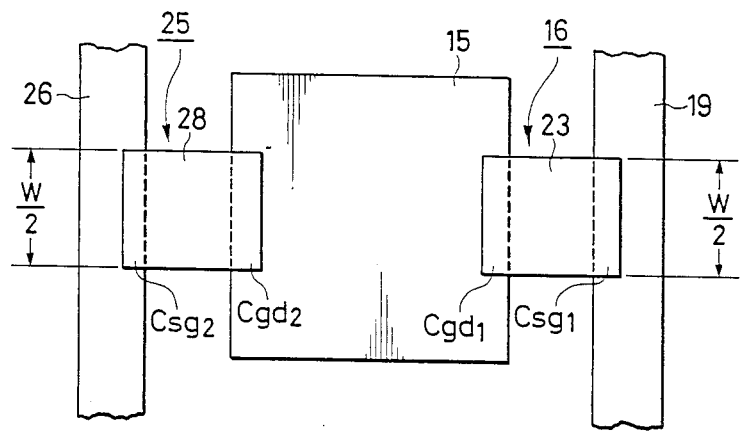
FIG. 8 is a diagram showing overlaps of a gate electrode on source and drain electrodes in FIG. 6.
Figure 9:
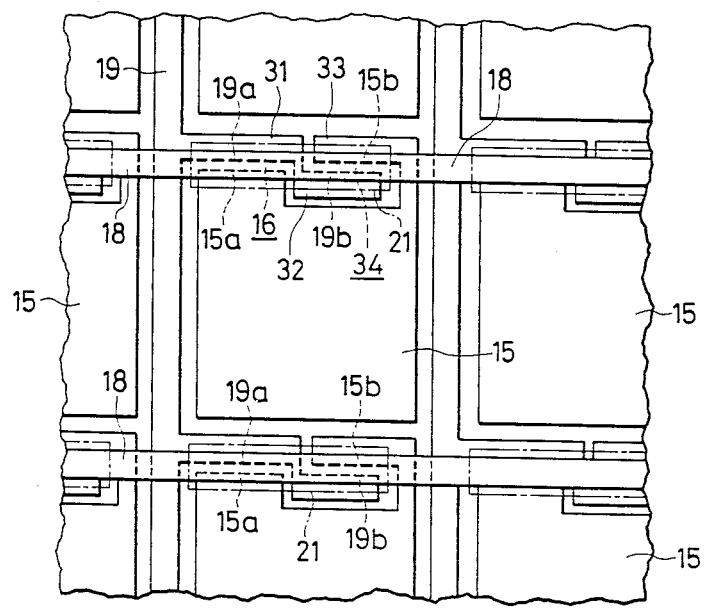
FIG. 9 is a plan view showing arrays of transistors and display electrodes in the case where an example of the array of the pixel driving transistors of the present invention is applied to an active matrix liquid crystal display device.

FIG. 9 is a schematic diagram, similar to FIGS. 3 and 6, illustrating the pixel driving thin film transistors of the present invention which are applied to an active matrix liquid crystal display device, the parts corresponding to those in FIGS. 3 and 6 being identified by the same reference numerals. In this example, the source bus 19 branches out at right angles, extending along one marginal portion of each display electrode 15, as indicated by 31, and one half of this marginal portion is staggered relative to the other half thereof, as shown. The branched pattern 31 is staggered to extend along the recessed marginal portion, and the staggered portion 32 is surrounded by a branched pattern 33 extending from the display electrode 15. An amorphous semiconductor layer 21 is formed to extend over the opposing marginal portions of the display electrode 15 and the branched pattern 31 and the opposing marginal portions of the staggered portion 32 and the branched pattern 33. Then, the gate insulating film 22 (not shown) is extended over the entire surface of the substrate. The gate bus 18 is formed on the gate insulating film 22 so that it overlaps the display electrode 15, the branched pattern 31, its staggered portion 32, and the branched pattern 33. The portions of the display electrode 15 and the branched pattern 33 which are opposed to the gate bus 18 serve as the drain electrodes 15a and 15b, respectively, and the portions of the branched pattern 31 and the staggered portion 32 which are opposed to the gate bus 18 serve as the source electrodes 19a and 19b, respectively. In other words, the drain and source electrodes 15a, 19a, 15b and 19b are arranged in parallel but opposite in direction, and these electrodes 15a, 15b, 19a and 19b are opposite the common gate electrode (i.e., the gate bus 18) via the common semiconductor layer 21 and the gate insulating film 22. The channels between the electrodes 15a and 19a and between the electrodes 15b and 19b are equal in length and in width and are aligned in a width direction.

With the above-described structure, the drain electrode 15a, the source electrode 19a, and the gate bus 18 constitute parts of the thin film transistor 16, and the drain electrode 15b, the source electrode 19b, and the gate bus 18 constitute parts of a thin film transistor 34. The thin film transistors 16 and 34 are connected in parallel to each other and operate as one composite transistor. It will easily be understood that even if the gate bus 18 is formed out of position in the direction of arrangement of the drain and source electrodes 15a and 19a owing to misalignment of the mask during fabrication, the gate-source capacitance and gate-drain capacitance of the transistor composed of the parallel-connected thin film transistors 16 and 34 will remain constant.

Furthermore, in this case, the gate bus 18 and the source bus 19 have substantially the same lengths as in the case of FIG. 3, and need not be lengthened. In the case of FIG. 6 two source buses are disposed between adjoining columns of display electrodes, whereas in this example only one source bus is provided; accordingly, the possibility of breakage of the source bus 19 diminishes and no short-circuiting occurs.

Figure 10:
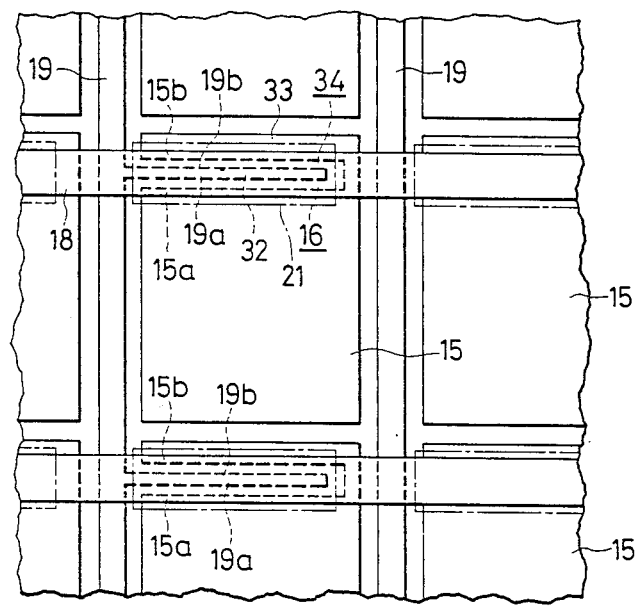
FIG. 10 is a plan view, similar to FIG. 9, showing an example in which the transistors of the present invention are disposed between branched patterns of the source bus and the display electrode.

It is also possible to employ such a structure as shown in FIG. 10, in which the branched pattern 31 of the source bus 19 is extended along substantially the entire length of one marginal edge of the display electrode 15 and is surrounded by the branched pattern of the display electrode 15. The gate bus 18 is provided so that it is partly opposed to the branched pattern 31, the display electrode 15, and the branched pattern 33. In this instance, one marginal portion of the branched pattern 31 of the gate bus 18 acts as the source electrode 19a and the opposite marginal portion as the source electrode 19b.

Figure 11:
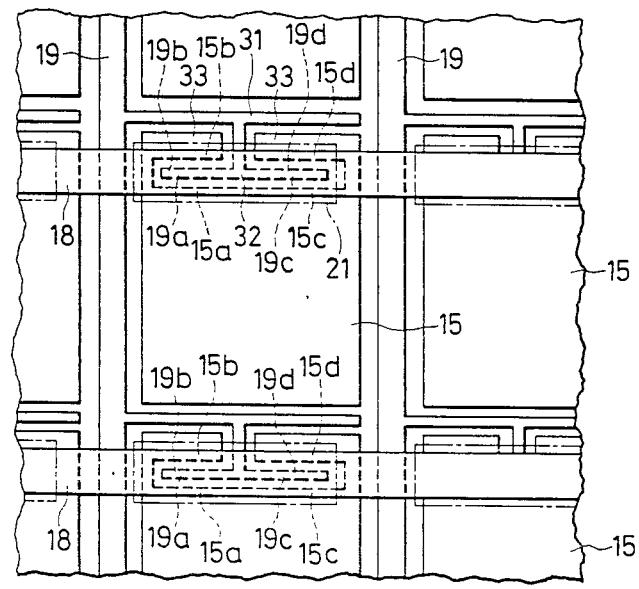
FIG. 11 is a diagram, similar to FIG. 9, illustrating an example in which four source electrodes and four drain electrodes are defined at opposite edge portions of the branched patterns of the source bus and the display electrode under the gate bus.

The number of source-drain electrode pairs is not limited specifically to two, but can be greater provided that there are an equal number of pairs in both opposite source-drain arrangement directions. FIG. 11 illustrates an example in which two such electrode pairs are provided in each of opposite directions. In FIG. 11, a pair of the drain electrode 15a and the source electrode 19a and a pair of the source electrode 19b and the drain electrode 15b are arranged widthwise of the gate bus 18 in opposite directions. Adjacent these electrodes in the lengthwise direction of the gate bus 18, a pair of drain electrode 15c and source electrode 19c and a pair of source electrode 19d and drain electrode 15d are similarly arranged widthwise of the gate bus 18 in opposite direction. The drain electrodes 15a and 15c are defined along one marginal portion of the display electrode 15, to both ends of which are connected the drain electrodes 15b and 15d. The source electrodes 19a to 19d are defined along the pattern 32 which extends along one marginal edge of the display electrode 15, and the pattern 32 is connected at its intermediate portion to the branched pattern 31.

Figure 12:
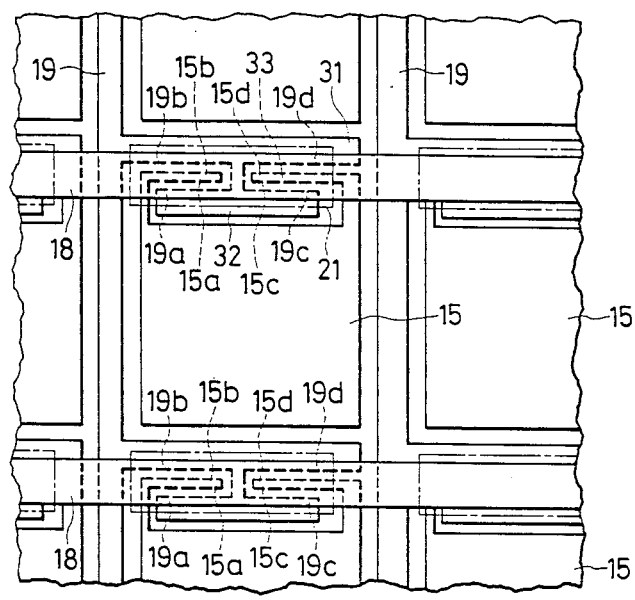
FIG. 12 is a diagram illustrating a modified form of the present invention in which the gate bus is shifted widthwise thereof in FIG. 11.
Figure 13:
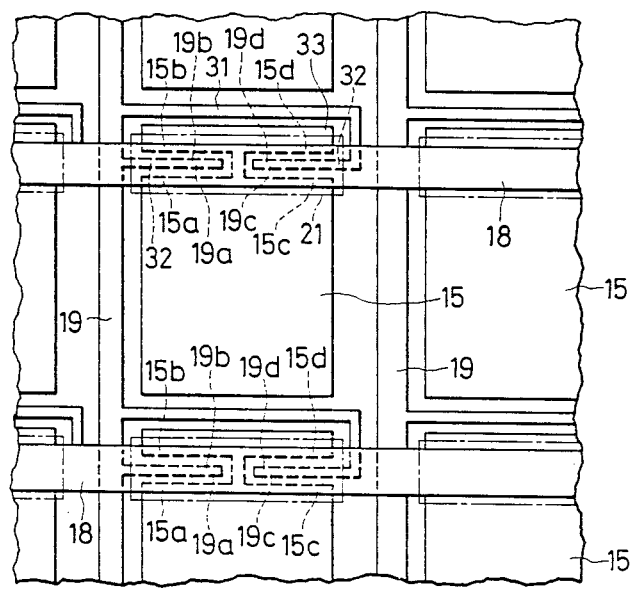
FIG. 13 is a diagram, similar to FIG. 9, illustrating another example of the present invention in which four source electrodes and four drain electrodes are defined at opposite edge portions of the branched patterns of the source bus and the display electrode under the gate bus.
Figure 14:
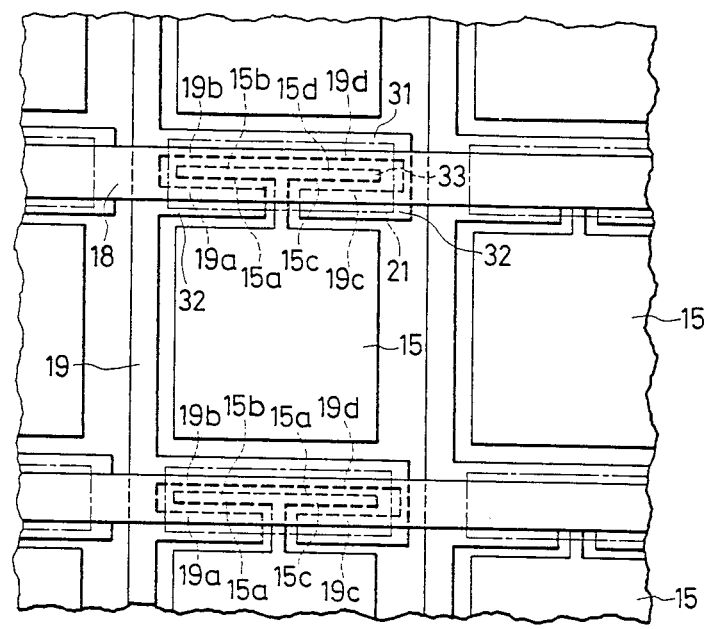
FIG. 14 is a diagram illustrating another modification in while the gate bus is shifted widthwise thereof in FIG. 13.
Figure 15:
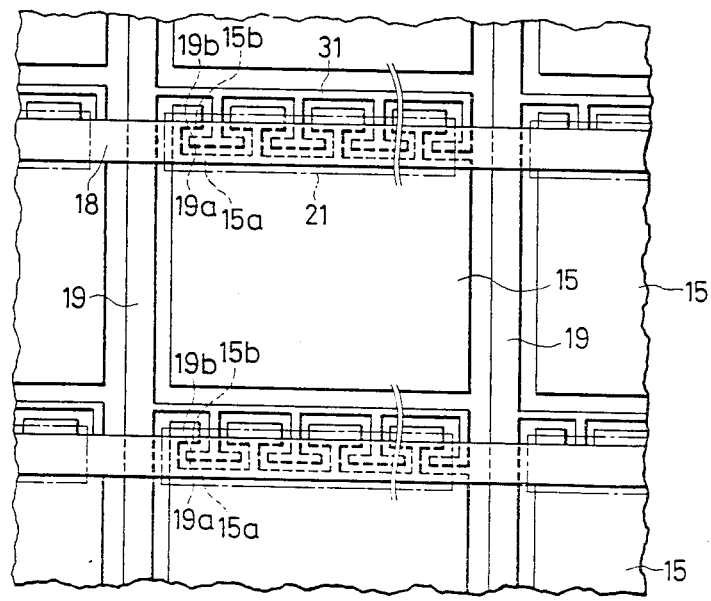
FIG. 15 is a diagram, similar to FIG. 9, illustrating another example of the present invention in which numbers of source and drain electrodes are defined at opposite edge portions of the branched patterns of the source bus and the display electrode under the gate bus.

FIG. 12 illustrates a modified form of the example shown in FIG. 11, in which the gate bus 18 is shifted widthwise thereof so that it overlaps the branched pattern 31 but does not overlap the display electrode 15. FIG. 13 illustrates another modification of the structure of FIG. 11, in which the drain electrodes 15b and 15d are both connected to the display electrode 15 at the intermediate portion of one marginal edge thereof, the source electrodes 19a and 19b are formed as one electrode 32, and the source electrodes 19c and 19d are also formed as one electrode 32 connected at one end to the branched pattern 31. That is, the branched pattern 33 is formed along one marginal edge of the display electrode 15, and the intermediate portion of the branched pattern 33 is connected to the display electrode 15. At one side of the intermediate portion the extended portion 32 of the source bus 19 is disposed between the display electrode 15 and the extended pattern 33, and at the other side of the intermediate portion another extended portion 32 of the source bus 19 is disposed between the display electrode 15 and the extended pattern 33 in a manner to encompass the pattern 33. FIG. 14 shows a modified form of the structure depicted in FIG. 13, in which the gate bus 18 is shifted widthwise thereof, as is the case with FIG. 12. FIG. 15 illustrates another example in which more electrode pairs are provided.

Figure 16:
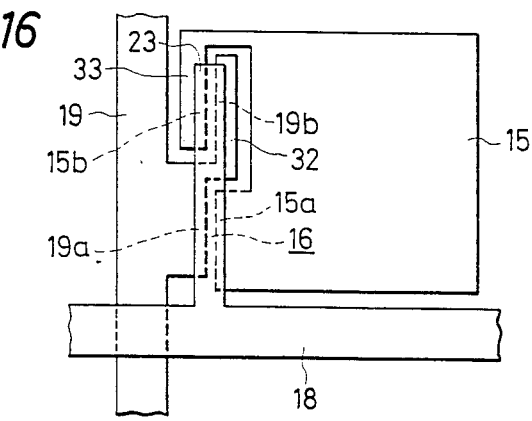
FIG. 16 is a diagram, similar to FIG. 9, illustrating the case where source and drain electrodes are defined at opposite edge portions of the branched patterns of the source bus and the display electrode under a branched pattern of the gate bus.
Figure 17:
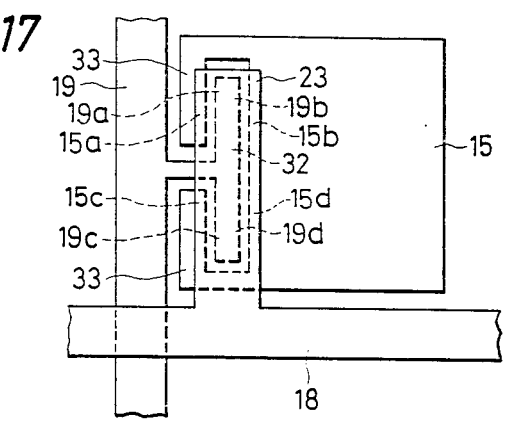
FIG. 17 is a diagram, similar to FIG. 11, illustrating an example in which four source electrodes and four drain electrodes are defined under a branched pattern of the gate bus.
Figure 18:
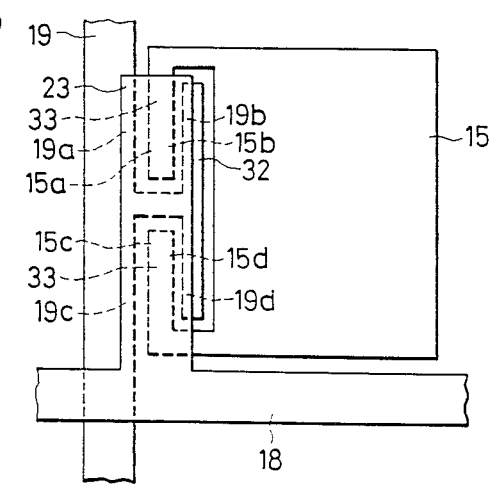
FIG. 18 is a diagram illustrating a modified form of the structure of FIG. 17 in which the gate electrode 23 is shifted.
Figure 19:
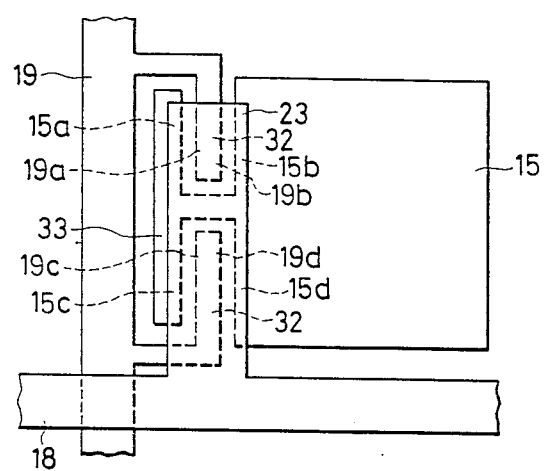
FIG. 19 is a diagram, similar to FIG. 13, showing an example in which four drain electrodes and four source electrodes are defined under a branched pattern of the gate bus.
Figure 20:
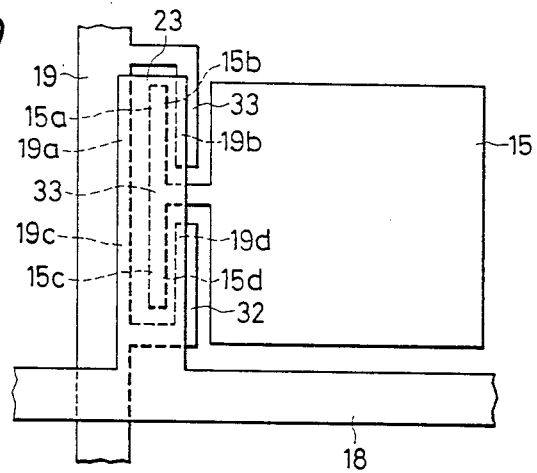
FIG. 20 is a diagram illustrating a modified form of the structure of FIG. 19 in which the gate electrode 23 is shifted.

In the above devices, the branch pattern 31 of the source bus 19 is formed, a plurality of transistors are provided between the branch pattern 31 and the display electrode 15, and the gate bus itself is used as the gate electrode common to the transistors. However, the present invention is also applicable to such a structure as depicted in FIG. 3 in which a transistor is formed between the source bus 19 and the display electrode 15 and its gate electrode is formed by a branch of the gate bus. Examples of this structure are shown in FIGS. 16 through 21, in which parts corresponding to those described above are identified by the same reference numerals. In FIG. 16 which corresponds to FIG. 9, since the gate electrode 23 is provided in the form of a straight band with a fixed width, the source bus 19 is partly widened toward the display electrode 15, providing a site for forming the source electrode 19b of the transistor 16. The structure of this example differs from the structure of FIG. 9 only in that the marginal edges defining the source and drain electrodes 19a, 19b and 15a, 15b are extended in parallel with the source bus 19. The same is true of the embodiments of FIGS. 17 to 21. FIG. 17 illustrates another example which is identical in structure with the example of FIG. 11. FIGS. 18, 19 and 20 show other examples which correspond to those of FIGS. 12, 13 and 14.

Figure 21:
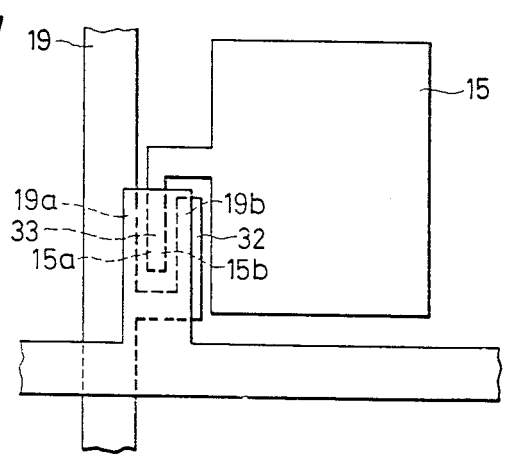
FIG. 21 is a diagram illustrating an example in which two source electrodes and two drain electrodes are aligned between the source bus and the display electrode.

One half portion of the extended pattern 33 in FIG. 20 may also be omitted, as shown in FIG. 21. The same is true of the structures shown in FIGS. 11 through 14, 17 and 18 as well as in FIG. 19.

It will be apparent that many modifications and variations may be effected without departing from the scope of the novel concepts of the present invention.

What is claimed is:

1. A pixel driving composite transistor for driving one of a plurality of display electrodes comprising:
    a source electrode having an even number of source electrode portions connected to a source bus;
    an even number of drain electrode portions respectively disposed adjacent the source electrode portions and connected to the same display electrode, half said number of drain electrode portions being opposite in their direction of arrangement relative to the source electrode portions from the other half of said number of drain electrode portions;
    a semiconductor layer for each pair of drain and source electrodes provided in common to all the source and drain electrode portions of the some such said pair thereof;
    a gate insulating film formed on the semiconductor layer; and
    a gate electrode formed on the gate insulating film in common to all the source and drain electrode portions such that one of the side edges of said gate electrode overlaps said half number of at least either said source or drain electrode portions and the other side edge of said gate electrode overlaps the other half number of at least either said source or drain electrode portions.

2. The pixel driving composite transistor according to claim 1, wherein said display electrode is one of a plurality of square electrodes arranged in a matrix form, a gate bus is provided for each row of the display electrodes, the source bus is one of a plurality of source buses provided for respective columns of the display electrodes, and the gate and source buses and each display electrode are connected to the composite transistor adjacent one side of said display electrode.

3. The pixel driving composite transistor according to claim 2, wherein the source bus or a pattern branched therefrom has an extension extending in the direction of extension of the source bus or branched pattern, the display electrode has an extended pattern extending between the extension and the source bus or branched pattern in parallel thereto, and the gate electrode is provided overlapping the source bus or branched pattern and the extended portion thereof.

4. The pixel driving composite transistor according to claim 2, wherein the source bus or a pattern branched therefrom has an extension extending in the direction of extension of the source bus or branched pattern, the display electrode has an extended pattern extending between the extension and the source bus or branched pattern in parallel thereto, and the gate electrode is provided overlapping the extended pattern and the display electrode.

5. The pixel driving composite transistor according to claim 3 or 4, wherein the extension is further extended, as a second extension, from its point of connection to the source bus or branched pattern in the opposite direction, the display electrode has a second extended pattern extending between the second extension and the source bus or branched pattern, and the gate electrode is extended with the same width on the second extension and the second extended pattern.

6. The pixel driving composite transistor according to claim 3 or 4, wherein the extended pattern is further extended, as a second extended pattern, from its point of connection to the display electrode in the opposite direction, the source bus or branched pattern has a second extension extending between the second extended pattern and the display electrode, and the gate electrode is extended with the same width on the second extended pattern and the second extension.

7. The pixel driving composite transistor according to claim 2, wherein the source bus has a branched pattern extending substantially perpendicularly thereto, the branched pattern has an extension disposed further to the display electrode than the extending end of the branched pattern and positioned in a recess made in the marginal edge of the display electrode, the display electrode has an extended pattern extending along the extension at the opposite side from the display electrode, and a gate bus extending between the branched pattern and the display electrode and between the extended pattern and the extension serves as the gate electrode.

8. The pixel driving composite transistor according to claim 2, wherein the source bus has an extension extending substantially perpendicularly thereto along one marginal edge of the display electrode, the display electrode has an extended pattern extending along the extension at the side opposite from the display electrode, and a gate bus formed overlapping the extended pattern, the extension and the display electrode serves as the gate electrode.

* * * * *